United States Patent
Benthien et al.

(10) Patent No.: US 11,548,638 B2
(45) Date of Patent: Jan. 10, 2023

(54) TROLLEY LIFT AND AIRCRAFT AREA, AND AIRCRAFT WITH TROLLEY LIFT

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 414 days.

(21) Appl. No.: 16/797,589

(22) Filed: Feb. 21, 2020

(65) Prior Publication Data

US 2020/0269984 A1 Aug. 27, 2020

(30) Foreign Application Priority Data

Feb. 25, 2019 (DE) .......................... 102019104685.8

(51) Int. Cl.
*B64D 11/00* (2006.01)
*B66B 9/00* (2006.01)

(52) U.S. Cl.
CPC ............ *B64D 11/0007* (2013.01); *B66B 9/00* (2013.01)

(58) Field of Classification Search
CPC ....... B64D 11/0007; B64D 11/04; B66B 9/00; Y02T 50/40; B64C 1/18
See application file for complete search history.

(56) References Cited

U.S. PATENT DOCUMENTS

| 6,464,169 | B1 * | 10/2002 | Johnson | B64D 11/00 244/118.6 |
| 6,663,043 | B1 * | 12/2003 | Luria | B64D 11/0007 244/118.1 |
| 7,080,806 | B2 * | 7/2006 | Mills | B64D 11/04 312/247 |
| 7,083,145 | B2 * | 8/2006 | Mills | B64D 11/00 244/118.5 |
| 8,840,065 | B2 | 9/2014 | Panzram et al. | |
| 2009/0114770 | A1 * | 5/2009 | Harrington | B64D 11/04 244/118.1 |
| 2015/0285278 | A1 * | 10/2015 | Claflin | F16J 3/06 248/318 |

FOREIGN PATENT DOCUMENTS

| DE | 1246963 A | 8/1967 | |
| DE | 10204892 A1 * | 8/2003 | ......... B64D 11/0007 |
| DE | 102005057605 A1 | 8/2007 | |
| DE | 102008052337 A1 | 5/2010 | |

OTHER PUBLICATIONS

German Search Report; priority document.

* cited by examiner

*Primary Examiner* — Valentina Xavier
(74) *Attorney, Agent, or Firm* — Greer, Burns & Crain, Ltd.

(57) ABSTRACT

A trolley lift for connecting a lower aircraft deck to an upper aircraft deck. The trolley lift comprises a platform configured to accommodate at least one trolley, wherein the platform delimits a lift compartment at the bottom, and a cover which delimits the lift compartment at the top. In particular, on a side facing away from the lift compartment, the cover at least partly forms a floor of the upper aircraft deck. Furthermore, an aircraft area having a trolley lift and an aircraft having a trolley lift and/or an aircraft area are described.

15 Claims, 5 Drawing Sheets

TROLLEY LIFT AND AIRCRAFT AREA, AND AIRCRAFT WITH TROLLEY LIFT

CROSS-REFERENCES TO RELATED APPLICATIONS

This application claims the benefit of the German patent application No. 102019104685.8 filed on Feb. 25, 2019, the entire disclosures of which are incorporated herein by way of reference.

FIELD OF THE INVENTION

The invention relates to a trolley lift, an aircraft area with a trolley lift, and an aircraft with a trolley lift and/or an aircraft area. In particular, the invention relates to a trolley lift having a cover which, on its outer side, at least partly forms a floor of an upper aircraft deck, and also an aircraft area and an aircraft with such a trolley lift.

BACKGROUND OF THE INVENTION

In conventional passenger aircraft, trolley lifts are installed in the region of a galley in order to transport trolleys between the galley and an aircraft deck (normally) located under the same. For example, on long-distance flights, trolleys for meals to be served later during the flight are stored in a lower deck (for example, in a space at the level of and close to the cargo). By means of one or more trolley lifts, the trolleys can be conveyed from the lower deck into the galley and also vice versa from the galley to the lower deck, and thus exchanged for a further meal or beverage.

SUMMARY OF THE INVENTION

The invention is based on an object of providing a trolley lift, an aircraft area and an aircraft each having a trolley lift with optimal utilization of the space that is available.

According to one aspect, for a better understanding of the present disclosure, a trolley lift for connecting a lower aircraft deck to an upper aircraft deck comprises a platform which is configured to accommodate at least one trolley, wherein the platform delimits a lift compartment at the bottom. The trolley lift further comprises a cover, which delimits the lift compartment at the top. The lift compartment is a compartment which can be moved between the lower aircraft deck and the upper aircraft deck and which is used to accommodate objects to be moved. The height of the lift compartment is defined by the platform and the cover, that is to say, the vertical space available for the transport of objects. In other words, the platform forms a base of the lift and therefore the lift compartment, and an underside (or inner side) of the cover forms the boundary of the lift compartment at the top.

Furthermore, the cover on its side facing away from the lift compartment at least partly forms a floor of the upper aircraft deck. The side facing away (or outer side) thus reaches at least as far as the floor of the upper aircraft deck. As a result, the trolley lift can be installed at any desired location in an aircraft and does not necessarily have to be installed in a galley. Thus, additional space is obtained in the galley, in particular of the order of magnitude of the space assumed by the platform and/or the cover of the trolley lift.

In one design variant, the lift compartment can be delimited laterally in one or more directions, that is to say, seen in the horizontal direction. For example, the platform and the cover can be connected to each other only by one or more elongated (slim) connecting elements, for example, round, angular or flat rods, so that the lift compartment of the trolley lift is open at the sides, apart from the connecting elements. Alternatively or additionally, at least one side wall can be installed in the trolley lift, which prevents objects from being able to fall out of the trolley lift, in particular objects being able to fall down off the platform. The side walls can represent part of the trolley lift or belong to aircraft components which are installed beside the trolley lift. The side walls can extend partly or wholly in the vertical direction between platform and cover.

In a further design variant, on its side facing away from the lift compartment, the cover can at least partly form a stair which leads from the upper aircraft deck to the lower aircraft deck. In other words, the trolley lift can be integrated into a stair between the upper and lower aircraft deck. Depending on the depth of the trolley lift (viewed in the direction of the staircase) the cover can form at least one step of the stairs. For example, a single trolley standing transversely can be accommodated in a lift which comprises only one step, so that only one step is also moved by the lift and/or has to be modified with respect to the remainder of the stair. Of course, the cover of the trolley lift can form at least two steps of the stair on its side facing away from the lift compartment. As a result, a lift compartment that is large overall can be provided.

As a result of the integration of the trolley lift into the stair, only a single opening is needed in the floor of the upper aircraft deck, which means that the floor can be more lightly configured overall. In an opening in an aircraft deck floor, it is generally necessary for reinforcements to be provided in the area surrounding the opening, which, as compared with a continuous floor, means additional weight. If only one opening is needed, weight can thus be saved overall.

In one design variant, the trolley lift can be provided, in particular, in an area of the stair which adjoins the upper aircraft deck. In other words, the first step(s) which lead(s) down from top to bottom can be provided on the cover of the trolley lift. Here, there is the greatest height for the lift compartment, so that even large objects (apart from trolleys) can be transported with the trolley lift.

In another design variant, on its side facing away from the lift compartment, the cover can at least partly form a gangway between two rows of passenger seats. This gangway area can in particular be used during the loading of the aircraft to connect the upper and lower aircraft decks, therefore, for example, to prepare the aircraft on the ground for new passengers. In order not to impair any evacuation path, the trolley lift should not be able to be used while passengers are on board the aircraft. For example, a mechanical and/or electronic safety device can be provided, which prevents the movement of the trolley lift, in particular in the gangway area, when boarding of the aircraft is to be started until a time at which there are no more passengers on board. Thus, the gangway area can be used at least temporarily by the trolley lift moved into the area of the upper aircraft deck. Here, too, valuable space is obtained in the galley. For example, the trolley lift can be installed in a starting region or end region of a gangway (viewed in the aircraft longitudinal direction), so that the trolley lift is still provided in the vicinity of the galley.

According to a further design variant, the trolley lift can additionally be configured to be longer in the longitudinal direction of the gangway (in the aircraft longitudinal direction), than, for example, in the case of a stair. As a result, a plurality of trolleys can be arranged in the trolley lift in the longitudinal direction of the gangway. Furthermore, such a trolley lift can also have two lateral openings, in particular as viewed in the longitudinal direction of the gangway. Therefore, trolleys or other objects can also be moved into and out of the trolley lift both at the front and at the back.

In a further design variant, on its side facing away from the lift compartment, the cover can be configured such that a passenger seat can be fixed thereto. For example, the passenger seat can be fixed directly to the cover of the trolley lift. In other words, a seat mounting of the passenger seat is fixed to the cover or can be integrated therein.

In one design variant, a flight attendant seat can be fixed to the cover of the trolley lift. The cover of the trolley lift can be configured such that it forms the foot of the flight attendant seat; the foot of the flight attendant seat is therefore integrated into the cover.

In each of the variants with seat, the cover of the trolley lift can have at least one seat rail for fixing the passenger seat and/or the flight attendant seat. As a result, standard components for fixing seats in aircraft can be used.

Furthermore, there can be a floor structure on the cover of the trolley lift, in order, if appropriate, to compensate for a difference in height between the cover of the trolley lift and the upper edge of the floor of the upper aircraft deck and/or to achieve the same feeling when walking on the cover as on a normal floor of the aircraft deck. For example, vibration-damping elements can be contained in the floor structure. Of course, the floor structure on the cover of the trolley lift can be identical to the conventional floor structure of the upper aircraft deck.

In a further design variant, the trolley lift can be configured to be moved between a lower position, in which a side of the platform that faces the lift compartment is arranged flush with an upper side of a floor of the lower aircraft deck and at least one section of the side of the cover that faces away from the lift compartment is arranged flush with an upper side of the floor of the upper aircraft deck, and an upper position, in which the side of the platform that faces the lift compartment is arranged flush with the upper side of the floor of the upper aircraft deck. In other words, the trolley lift in the lower position is arranged between the floor of the lower and upper aircraft decks such that in the lower aircraft deck trolleys and other objects can easily be moved into and/or placed in the lift compartment of the trolley lift (onto the platform), while the floor of the upper aircraft deck has no irregularities or interruptions. The upper aircraft deck can therefore be used without any interference, as though there would be no trolley lift. In the upper position of the trolley lift, the trolley/s and/or other objects can easily be removed from the lift compartment of the trolley lift (from the platform). Trolleys can, for example, be moved easily from the platform flush with the floor of the upper aircraft deck onto the floor.

Furthermore, according to one design variant, the platform can be configured to be moved in the vertical direction independently of a movement of the trolley lift. In other words, the platform can be moved relative to the cover of the trolley lift. This is particularly helpful if the trolley lift is limited in its vertical lifting height on account of the floor elements or stair elements installed on the cover of the trolley lift, for example the freedom of movement of the trolley lift is restricted at the top by a ceiling of the upper aircraft deck. In order to move the platform into a position in which it is arranged flush with the floor of the upper aircraft deck, the platform can perform an additional vertical movement. Although the lift compartment becomes smaller it is still sufficiently large for most objects, in particular trolleys.

For the movement of the trolley lift between the upper position and the lower position and vice versa, conventional mechanisms can be used, for example hydraulic drives, chain drives, rack drives, etc. can be used. Likewise, a mechanism for moving the platform relative to the cover of the trolley lift can be implemented in the same way. For example, hydraulic drives, chain drives, rack drives, etc. can also be used here.

According to a further aspect for the better understanding of the present disclosure, an aircraft area comprises at least one section of a floor of a lower aircraft deck, at least one section of a floor of an upper aircraft deck and at least one trolley lift according to the first aspect or one of the design variants thereof.

In one design variant of the aircraft area, the latter can comprise at least one locking element, which is configured to fix the trolley lift in a predefined position. Thus, the trolley lift can be fixed both in a lower position and in an upper position, so that the platform of the trolley lift is fixed so as to be arranged flush either with the floor of the lower aircraft deck or with the floor of the upper aircraft deck. The locking element prevents the trolley lift from being moved inadvertently (in particular, vertically between the lower and upper position of the trolley lift), which means that injuries to passengers and crew attendants and damage to the trolley lift and/or objects located therein are prevented.

In one exemplary configuration, the locking element can be actuated by a controller which is connected to sensors which monitor an area above the cover of the trolley lift. For example, at least one light barrier, photosensor, weight sensor or the like can determine whether persons or objects are located in an area of the floor of the upper aircraft deck or in the vicinity of the cover of the trolley lift. Only when this area is free can the locking element be actuated and the movement of the trolley lift released.

In a further design variant, the locking element is arranged on the trolley lift. For example, the locking element can be movably provided on the trolley lift in the form of a securing pin or securing bolt. In a locking position of the locking element, the locking element looks out of a lateral border of the trolley lift and can be brought into mechanical engagement with a corresponding locking element outside the trolley lift (for example, a component arranged at right angles to the direction of movement of the locking element—optionally having an opening into which the locking element can be moved). Here, the lateral border of the trolley lift is to be understood as an area along which the trolley lift moves between the upper and lower position (for example, a border of the trolley lift in a plan view of the trolley lift), wherein the locking element can look out of the movement space of the trolley lift.

Alternatively or additionally, a locking element can also be provided in an area outside the trolley lift. The locking element can be provided such that it can be moved into the movement space of the trolley lift. There, it can interact with a corresponding mating piece which is fixed to the trolley lift (for example, brought into mechanical engagement), by which means the trolley lift can be prevented from a movement between the lower and upper position by the locking element.

According to one design variant, the at least one locking element can be arranged in the cover and/or the platform. Alternatively or additionally, the locking element can be arranged at the height of the cover and/or the platform in the lower position and/or in the upper position of the trolley lift and interact with a corresponding locking element in the cover or the platform, respectively.

In yet another design variant, the aircraft area can also comprise a lower stair segment, which is arranged on the floor of the lower aircraft deck. For example, the lower stair segment comprises one or more steps which form the first steps of the stair from the lower aircraft deck toward the top. The trolley lift can be arranged such that a rear wall of the trolley lift adjoins the lower stair segment when the trolley lift is in a lower position. Thus, in a side view of the trolley lift and of the lower stair segment, the trolley lift can adjoin the lower stair segment flush. As a result, steps arranged on the trolley lift can directly adjoin the steps of the lower stair segment, so that a continuous stair is produced when the trolley lift is in its lower position. A joint between the trolley lift and lower stair segment can be closed, for example, by a resilient material (for example, a rubber lip or the like). This resilient material can, in particular, be provided on the trolley lift, by which means additional edge protection on the trolley lift is ensured when the trolley lift moves from the lower position to the upper position and is located in the latter.

In another design variant, the aircraft area can also comprise at least one blocking element which is configured to block access to the floor of the upper aircraft deck which is at least partly formed by the cover of the trolley lift. Alternatively or additionally, the aircraft area can comprise at least one blocking element which is configured to block access to an area of the floor of the lower aircraft deck beside the trolley lift. Such a blocking element can be provided in the form of a barricade, barrier, bar, etc. which blocks the floor area of the upper aircraft deck or the floor area of the lower aircraft deck beside the trolley lift. The respective blocking element can then block the floor area of the respective aircraft deck when the trolley lift is moved. For example, the floor area of the upper aircraft deck can be freely accessible when the trolley lift moves in the lower position. However, if the trolley lift is to be moved away from the lower position, one or more blocking elements laterally beside the area of the cover of the trolley lift can block the access to this floor area (the cover of the trolley lift).

In the event that part of a stair is arranged on the cover of the trolley lift, the at least one blocking element can also be configured to block access from the floor of the lower aircraft deck to the lower stair segment and/or access from the floor of the upper aircraft deck to a stair partly formed by the lower stair segment.

In a further design variant, a locking element for locking the trolley lift can be coupled mechanically to the at least one blocking element, or a controller which actuates both the locking element and the at least one blocking element can be provided. Therefore, the blocking element is able to block the access to the area of the trolley lift or to the stair when the locking element releases the trolley lift. As a result, persons are prevented from entering the area of the trolley lift or using the stair while the trolley lift can be moved, that is to say, while part of the floor of the upper aircraft deck or part of the stair can be moved with the movement of the trolley lift.

In yet another configuration, the aircraft area can also comprise at least one passenger seat, which is fixed to the cover of the trolley lift. Here, a locking element for locking the trolley lift can be configured to be fixed in a locking position when a weight on the passenger seat exceeds a specific threshold value. For example, by means of a weight sensor or an appropriate mechanism, the locking element can be blocked when there is a person on the passenger seat. The threshold value for this can be set to be very low, for example lower than 1 kg, 2 kg or 5 kg, so that even children or infants block the movement of the locking element.

Alternatively or additionally, the aircraft area can also comprise at least one passenger seat which is fixed in the section of the floor of the upper aircraft deck beside the cover of the trolley lift. In other words, the trolley lift can be provided in the area of passenger seats, wherein the trolley lift can be installed either beside the passenger seats, for example in a gangway, or under an individual or multiple passenger seat/s. Instead of a passenger seat, also a flight attendant seat can be provided, which is installed on the trolley lift or beside the trolley lift in the aircraft area.

According to a further aspect for the better understanding of the present disclosure, an aircraft comprises a trolley lift according to the first aspect or one of the design variants thereof. Alternatively or additionally, the aircraft can comprise an aircraft area according to the second aspect or one of the design variants thereof.

The above-described aspects, configurations and variants can, of course, be combined without this being explicitly described. Each of the described design variants is thus optional to each of the aspects, refinements and variants or already combinations thereof. The present disclosure is thus not restricted to the individual configurations and design variants in the described order or a specific combination of the aspects and design variants.

BRIEF DESCRIPTION OF THE DRAWINGS

A preferred embodiment of the invention will now be explained in more detail by using the appended schematic drawing, wherein.

DETAILED DESCRIPTION OF THE PREFERRED EMBODIMENTS

In the present disclosure, terms such as "upper" and "lower" are used with regard to the arrangement of two aircraft decks and the movement of a trolley lift between the two aircraft decks. Here, in particular, they are based on the vertical direction of movement of the trolley lift and the aircraft decks arranged in the vertical direction relative to each other. Terms such as "lateral" and "right" and "left," on the other hand, relate to a horizontal direction, which is perpendicular to the vertical direction. For example, the floors of the two aircraft decks extend substantially horizontally. A longitudinal direction of the aircraft is a horizontal direction which extends from the nose to the rear of the aircraft (therefore corresponds to the direction of flight).

In FIGS. 1 to 4, a cross section in a side view of an aircraft area 5 which comprises two aircraft decks located above one another is illustrated. The lower aircraft deck has a floor 4, and the upper aircraft deck has a floor 6, on each of which persons can walk, objects can be rolled or pushed, etc. For example, each of the two aircraft decks can be a passenger cabin and/or a cargo bay. In many passenger aircraft, a passenger cabin is arranged in the upper flight deck, while a toilet and/or further rows of seats and a cargo bay for luggage and other items of cargo are provided in the lower aircraft deck. Of course, aircraft having two passenger decks (and a further cargo deck) also fall under the present disclosure.

In the aircraft area 5, a trolley lift 10 for connecting the lower aircraft deck to the upper aircraft deck is installed. The trolley lift 10 comprises a platform 12, on which at least one trolley 30 or other objects can be accommodated. The platform delimits a lift compartment (the compartment provided for the transport of trolley(s) 30 and/or objects) at the bottom. A cover 11 delimits the lift compartment at the top.

On a side facing away from the lift compartment (directed upward in FIGS. 1 to 8), the cover 11 of the trolley lift 10 at least partly forms a floor 6 of the upper aircraft deck. In the variant illustrated in FIGS. 1 to 4, the cover 11 at least partly forms a stair 20 which leads from the upper aircraft deck to the lower aircraft deck, that is to say, from the floor 6 to the floor 4. A further section of the stair 20 is formed by a lower stair segment 21 which is arranged on the floor 4 of the lower aircraft deck. The number of steps arranged on the cover 11 of the trolley lift 10 can be chosen freely, depending on the angle of inclination of the stair and the depth of the trolley lift (horizontal extent in the drawing plane of FIGS. 1 to 4). For example, only a single step or a plurality of steps can be provided on the cover 11.

Figure 1:
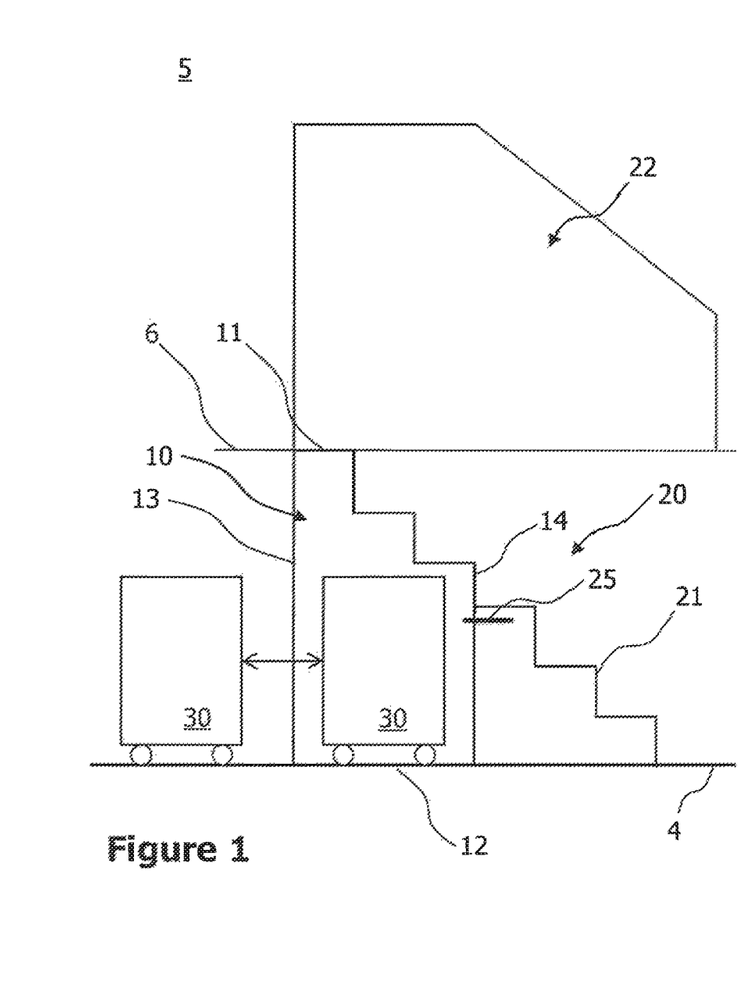
FIGS. 1 to 4 show, schematically, a side view of an aircraft area having a trolley lift and a lower stair segment in various states of the trolley lift.
Figure 2:
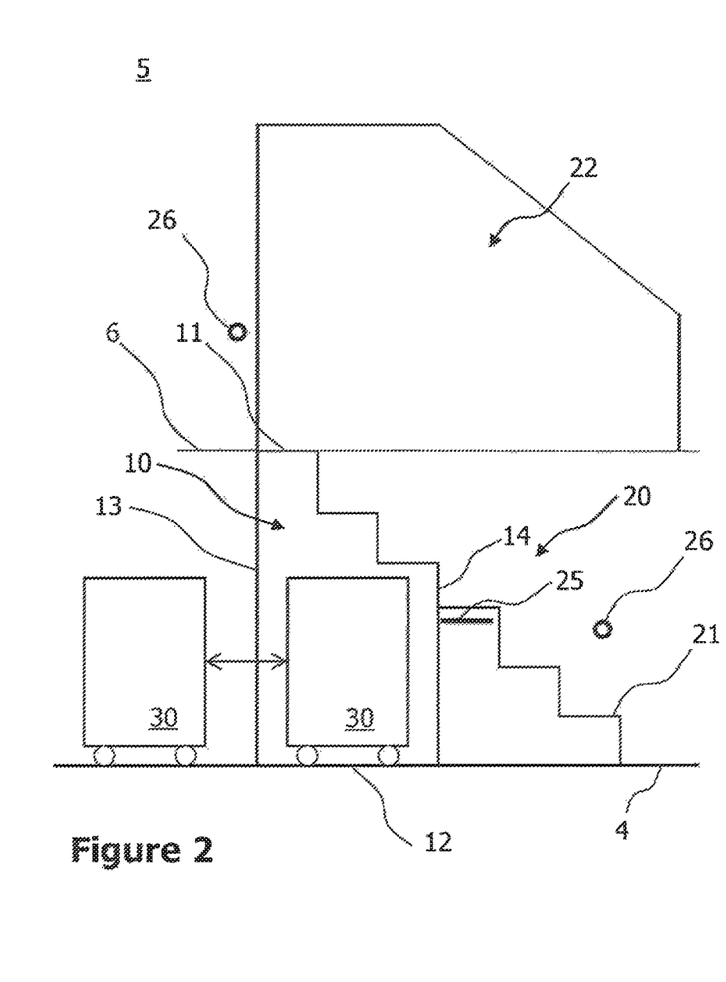

The trolley lift has an opening 13, through which one or more trolleys 30 can be pushed into the lift compartment or removed from the lift compartment (see the double arrow in FIGS. 1 and 2). The opening 13 can be closed by a door (not explicitly shown). Opposite the opening 13, a rear wall 14 of the trolley lift is provided which adjoins the lower stair segment 21 when the trolley lift 10 is in a lower position, as illustrated in FIG. 1.

In FIGS. 1 and 2, the trolley lift 10 is illustrated in a lower position in which a side of the platform 12 that faces the lift compartment is arranged flush with an upper side of the floor 4 of the lower aircraft deck. Furthermore, at least one section of the side of the cover 11 that faces away from the lift compartment is arranged flush with an upper side of the floor 6 of the upper aircraft deck. In other words, the upper side (viewed from the lift compartment: the outer side) of the cover 11 forms part of the floor 6 of the upper aircraft deck.

As opposed to the variant with a stair illustrated in FIGS. 1 to 4, the uppermost step of the stair section arranged on the cover 11 does not have to have a horizontal section which is arranged flush with the floor 6 of the upper aircraft deck. Instead, the uppermost section of the cover 11 can form the upper side of the last step of the stair in front of the floor 6 of the upper aircraft deck, so that the length of the step (horizontal extent to the right and left in FIGS. 1 to 4) can be shortened. In addition, the overall height of the trolley lift 10 is lower, so that the latter, as it is moved into an upper position (see FIGS. 3 and 4), runs less risk of colliding with a component or object arranged in the upper aircraft deck (for example, of colliding with a ceiling of the upper aircraft deck).

In order to prevent movement of the trolley lift 10 in the lower position, at least one locking element 25 can produce a mechanical connection between the trolley lift 10 and a component surrounding the trolley lift 10, in order to fix the trolley lift 10 in the predefined position. For example, the locking element 25 can couple the trolley lift 10 mechanically with the lower stair segment 21. The locking element 25 can be installed in the lower stair segment 21, as emerges from FIGS. 1 and 2. Alternatively, the locking element 25 can also be installed in the trolley lift 10 and interact with the lower stair segment 21 or another component arranged at a height of the locking element 25.

Figure 3:
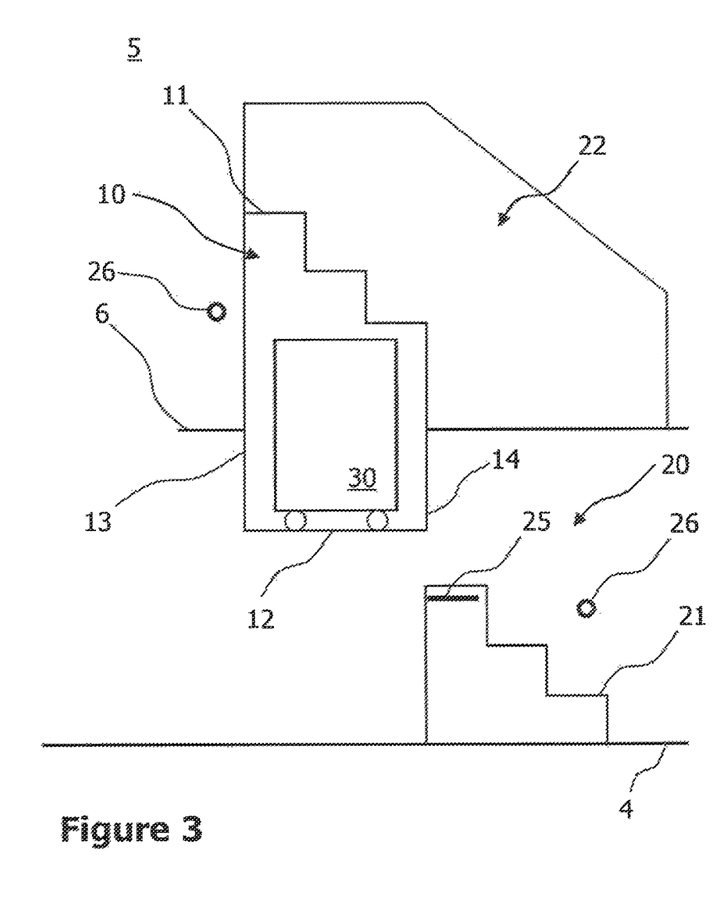

Furthermore, the aircraft area 5 can comprise at least one blocking element 26, which blocks access to the floor 6 of the upper aircraft deck, which is at least partly formed by the cover 11 of the trolley lift 10, and/or access to an area of the floor 4 of the lower aircraft deck beside the trolley lift 10. In FIGS. 2 and 3, blocking elements 26 are illustrated in the upper aircraft deck in front of the staircase and in the lower aircraft deck at the height of the lower stair segment 21. Of course, the position and the number of blocking elements 26 can vary. For example, a blocking element 26 (illustrated only in FIG. 4) can be provided in front of the opening 13 of the trolley lift 10 in the lower aircraft deck, in order to block the area beside the trolley lift 10. Blocking is necessary, in particular, when the latter is located in an upper position (FIG. 4) or is to be moved to the lower position again.

The at least one blocking element 26 can be coupled to a mechanism and/or controller (not explicitly illustrated) of the locking element 25, so that the locking element 25 releases the trolley lift 10 only when the at least one blocking element 26 blocks the access to the area of the trolley lift 10 in the upper aircraft deck and/or in the lower aircraft deck.

Figure 4:
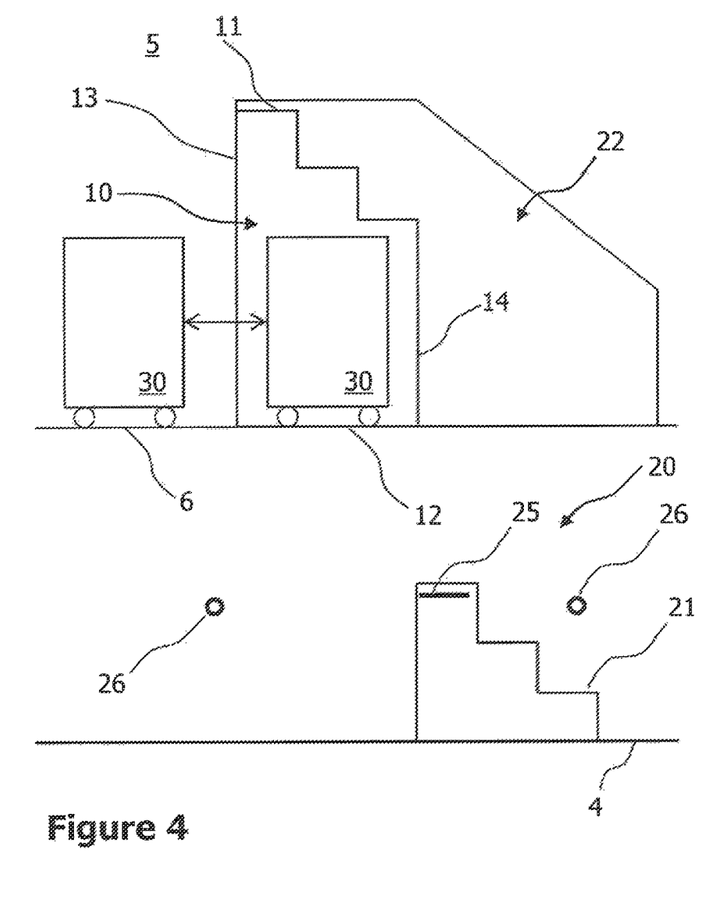

In FIG. 4, the trolley lift 10 is illustrated in an upper position. Here, the side of the platform 12 that faces the lift compartment is arranged flush with the upper side of the floor 6 of the upper aircraft deck, so that the at least one trolley 30 can easily be moved into and out of the trolley lift 10 on the floor 6 of the upper aircraft deck (see the double arrow in FIG. 4). The trolley lift 10 must be dimensioned such that the highest point of the cover 11 fits into an area of a staircase 22. As already explained above, for example, the first (highest) step can be placed lower for this purpose. In addition, the platform 12 may also be movable relative to the cover 12 and/or relative to the rear wall 14. Thus, the platform 12 can likewise be moved vertically for the case in which the trolley lift 10 in its upper (highest) position cannot be arranged high enough to produce a flush transition between platform 12 and floor 6 of the upper aircraft deck. Such a relative movement of the platform 12 can also be used for tolerance compensation between platform 12 and floor 6 of the upper aircraft deck.

Figure 5:
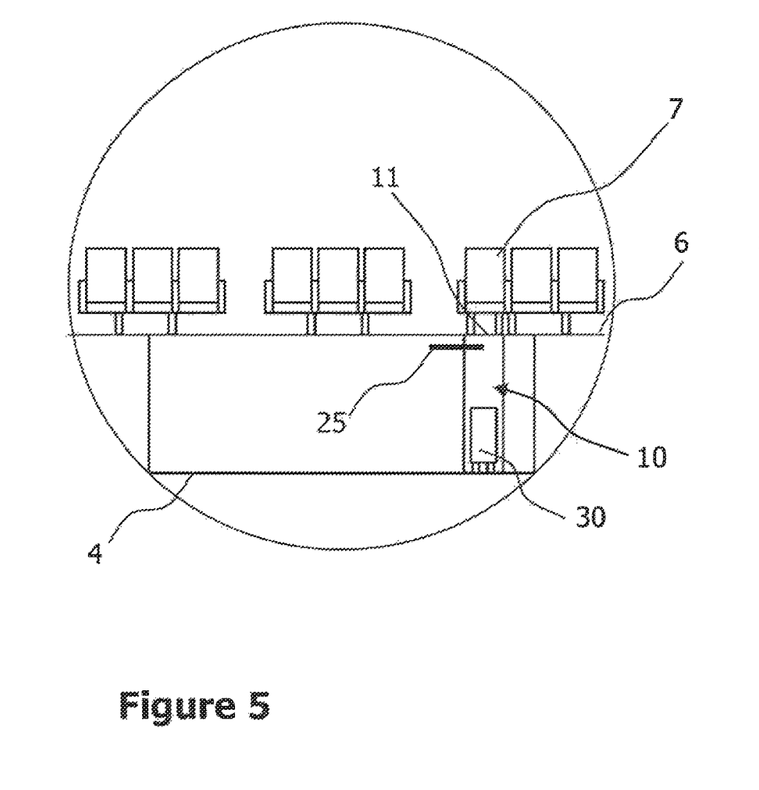
FIGS. 5 and 6 show, schematically, a cross-sectional view of an aircraft having an aircraft area with a trolley lift and a passenger seat arranged thereon in various states of the trolley lift.
Figure 6:
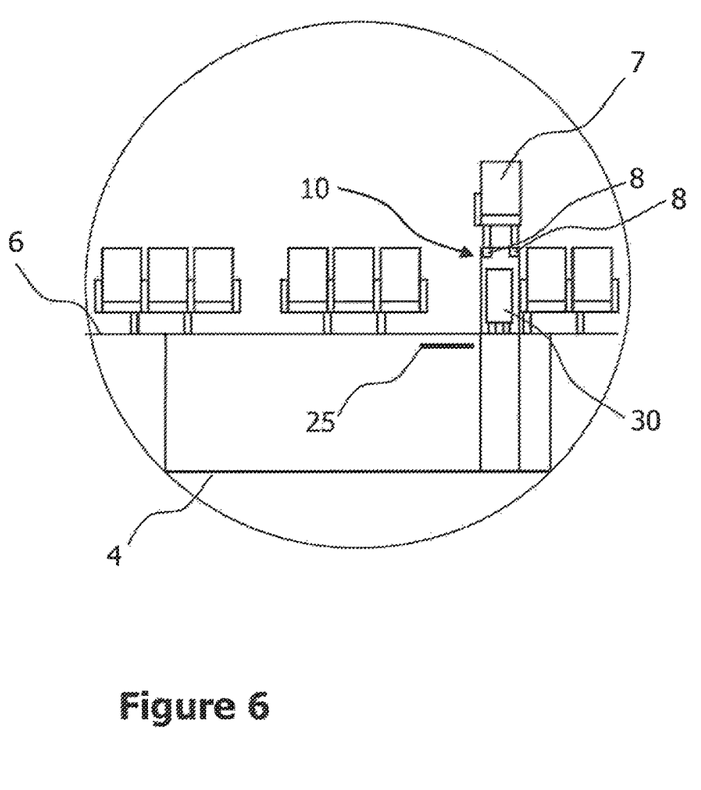

FIGS. 5 and 6 show another design variant of a trolley lift 10. Elements which correspond or at least functionally correspond to those from the design variant of FIGS. 1 to 4 have been provided with the same designations. In order to avoid repetitions, a detailed description of the same elements has been omitted here. In particular, FIGS. 5 and 6 show, schematically, a cross-sectional view of an aircraft 1 (see FIG. 9) having an aircraft area 5 with a trolley lift 10 and a passenger seat 7 arranged thereon in various states of the trolley lift 10. In FIG. 5, the trolley lift 10 is illustrated in a lower position, in which the side of the platform 12 that faces the lift compartment is arranged flush with the upper side of the floor 4 of the lower aircraft deck, so that at least one trolley 30 and/or other objects can easily be moved out of or into the trolley lift 10 onto the floor 4 of the lower aircraft deck. FIG. 6 shows, in a corresponding way, the trolley lift 10 in the upper position, in which the side of the platform 12 that faces the lift compartment is arranged flush with the upper side of the floor 6 of the upper aircraft deck, so that the trolley 30 and/or other objects can easily be moved out of and into the trolley lift 10 on the floor 6 of the upper aircraft deck.

Furthermore, seat rails 8 (illustrated only in FIG. 6) can be provided on or in the cover 11 of the trolley lift, in order to fix the passenger seat 7 via standard components. Instead of or in addition to the passenger seat 7, a flight attendant seat can also be installed.

Also in this design variant, a locking element 25 can fix the trolley lift 10 in a specific position; in FIG. 5, the lower position of the trolley lift 10 is illustrated for this purpose. Such a locking element 25 can, for example, be blocked via a mechanism and/or a controller if a person or an object is located on the passenger seat 7. For example, the movement of the locking element 25 can be blocked beginning at a low weight (less than 5 kg or even less than 1 kg), which loads the passenger seat 7.

Figure 7:
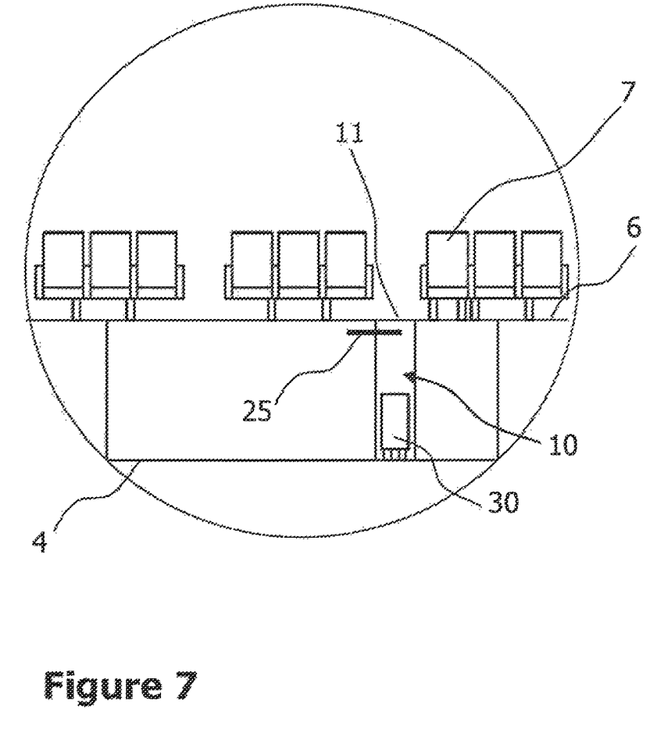
FIGS. 7 and 8 show, schematically, a cross-sectional view of an aircraft having an aircraft area with a trolley lift arranged in a gangway beside passenger seats in various states of the trolley lift.
Figure 8:
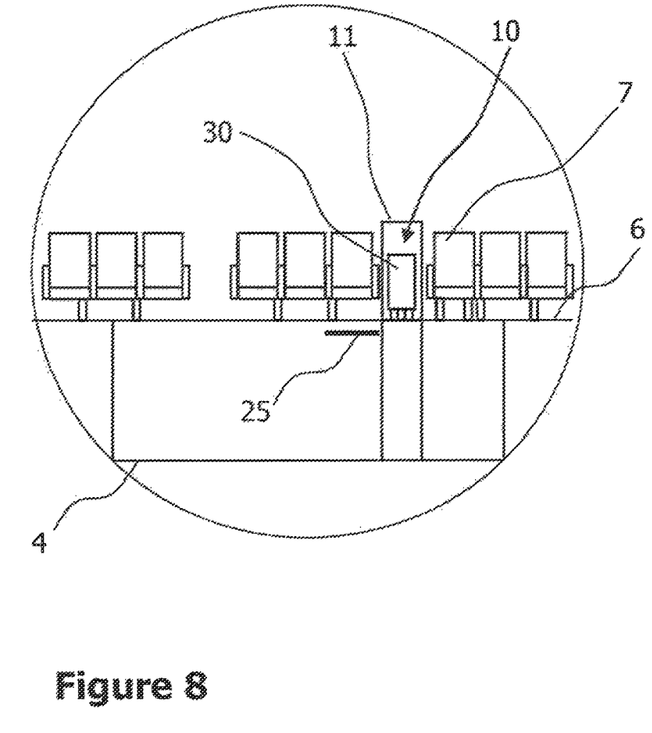

In the design variant according to FIGS. 7 and 8, which, schematically, show a cross-sectional view of an aircraft 1 having an aircraft area 5 with a trolley lift 10 arranged in a gangway beside passenger seats 7 in various states of the trolley lift 10, a similar arrangement to that of FIGS. 5 and 6 is shown. Instead of being arranged under a passenger seat 7, the trolley lift 10 is arranged under a gangway between the rows of passenger seats. This permits a greater longitudinal extent (at right angles to the drawing plane of FIGS. 7 and 8) of the trolley lift, which means that more or larger trolleys 30 or objects can be transported with the trolley lift 10. The positions of the trolley lift 10 that are illustrated in FIGS. 7 and 8 correspond to those from FIGS. 5 and 6. The remaining elements correspond to those from the design variants according to FIGS. 1 to 6 and are provided with the same designations.

Figure 9:
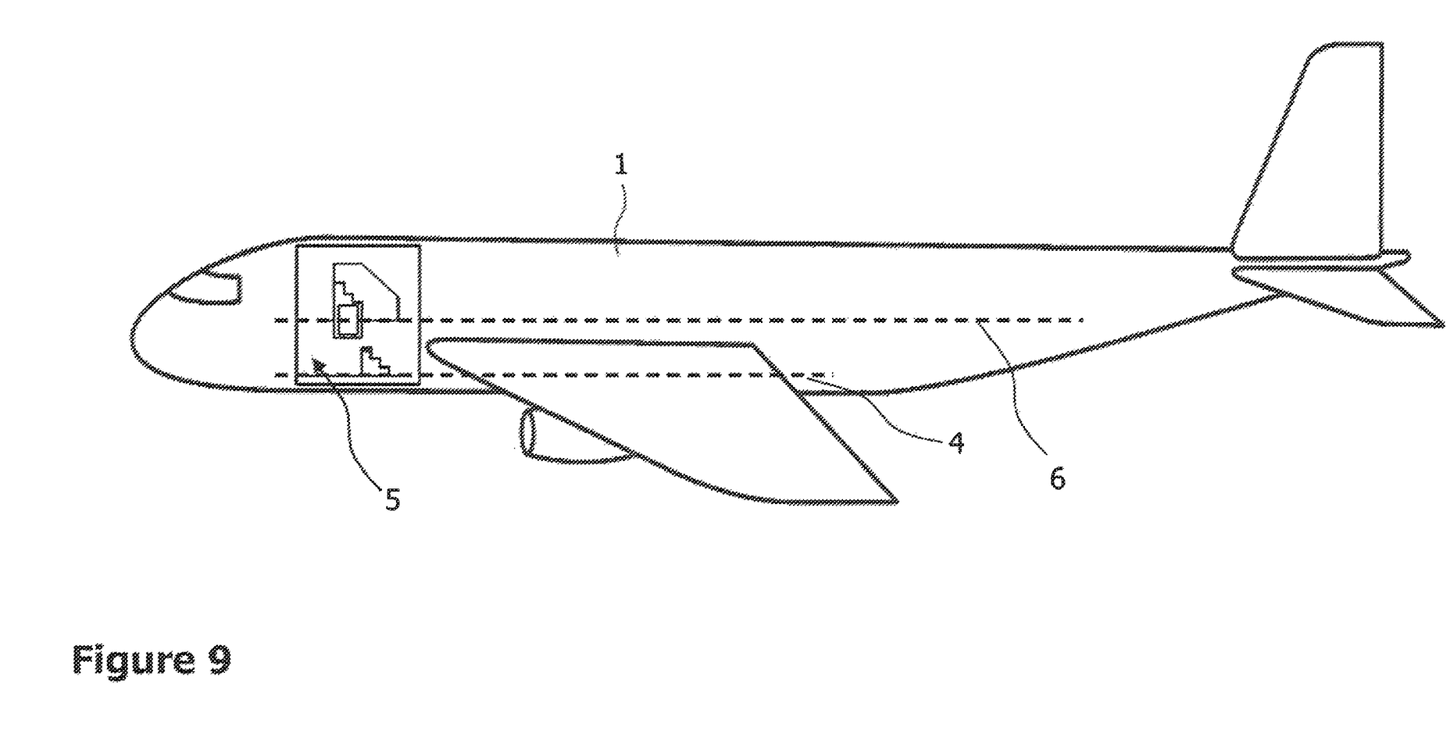
FIG. 9 shows, schematically, an aircraft having an aircraft area with a trolley lift.

FIG. 9 shows, schematically, an aircraft 1 having an aircraft area 5 with a trolley lift 10. Although in FIG. 9 the design variant according to FIGS. 1 to 4 is illustrated, it is obvious that, alternatively or additionally, at least one trolley lift 10 according to one of the configurations of FIGS. 5 and 6 and/or FIGS. 7 and 8 can be installed in the aircraft 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A trolley lift for connecting a lower aircraft deck to an upper aircraft deck, wherein the trolley lift comprises:
   a platform, which is configured to accommodate at least one trolley, wherein the platform delimits a lift compartment at the bottom, and
   a cover, which delimits the lift compartment at the top, wherein, on a side facing away from the lift compartment, the cover at least partly forms a floor of the upper aircraft deck.

2. The trolley lift as claimed in claim 1, wherein, on a side facing away from the lift compartment, the cover at least partly forms a stair which leads from the upper aircraft deck to the lower aircraft deck.

3. The trolley lift as claimed in claim 2, wherein the cover forms at least one step of the stair.

4. The trolley lift as claimed in claim 1, wherein, on its side facing away from the lift compartment, the cover at least partly forms a gangway between two rows of passenger seats.

5. The trolley lift as claimed in claim 1, wherein, on its side facing away from the lift compartment, the cover is configured to accommodate a fixing of a passenger seat thereto.

6. The trolley lift as claimed in claim 5, wherein the cover of the trolley lift has at least one seat rail for fixing the passenger seat.

7. The trolley lift as claimed in claim 1, wherein the trolley lift is configured to be moved between a lower position, in which a side of the platform that faces the lift compartment is arranged flush with an upper side of a floor of the lower aircraft deck and at least one section of the side of the cover that faces away from the lift compartment is arranged flush with an upper side of the floor of the upper aircraft deck, and an upper position, in which the side of the platform that faces the lift compartment is arranged flush with the upper side of the floor of the upper aircraft deck.

8. An aircraft area, comprising:
   at least one section of a floor of a lower aircraft deck;
   at least one section of a floor of an upper aircraft deck;
   at least one trolley lift for connecting a lower aircraft deck to an upper aircraft deck, wherein the at least one trolley lift comprises;
   a platform, which is configured to accommodate at least on trolley, wherein the platform delimits a lift compartment at the bottom, and
   a cover, which delimits the lift compartment at the top, wherein, on a side facing away from the lift compartment, the cover at least partly forms a floor of the upper aircraft deck; and,
   a lower stair segment, which is arranged on the floor of the lower aircraft deck,
   wherein the trolley lift is arranged such that a rear wall of the trolley lift adjoins the lower stair segment when the trolley lift is in a lower position.

9. The aircraft area as claimed in claim 8, further comprising:
   at least one locking element, which is configured to fix the trolley lift in a predefined position.

10. The aircraft area as claimed in claim 8, further comprising at least one blocking element which is configured to block access to the floor of the upper aircraft deck which is at least partly formed by the cover of the trolley lift.

11. The aircraft area as claimed in claim 8, further comprising at least one blocking element, which is configured to block access to an area of the floor of the lower aircraft deck beside the trolley lift.

12. The aircraft area as claimed in claim 8, further comprising at least one passenger seat which is fixed to the cover of the trolley lift.

13. The aircraft area as claimed in claim 8, further comprising:
   at least one passenger seat, which is fixed in the section of the floor of the upper aircraft deck beside the cover of the trolley lift.

14. An aircraft with a trolley lift as claimed in claim 1.

15. An aircraft with an aircraft area as claimed in claim 8.

* * * * *